United States Patent

Skopec et al.

[11] Patent Number: 5,084,980
[45] Date of Patent: Feb. 4, 1992

[54] LASER ALIGNMENT SYSTEM FOR WELL EQUIPMENT

[75] Inventors: Robert A. Skopec, Dallas; Douglas E. Jeffers, Midland; Freddy W. Hagins, Stanton, all of Tex.

[73] Assignees: Oryx Energy Co., Dallas; Diamant Boart Stratabit, Houston, both of Tex.

[21] Appl. No.: 566,620

[22] Filed: Aug. 13, 1990

[51] Int. Cl.$^5$ .............................................. G01D 21/00
[52] U.S. Cl. ...................................... 33/286; 33/228; 33/299; 33/624; 33/DIG. 21; 356/153
[58] Field of Search ................. 33/285, 286, 228, 299, 33/DIG. 21, 227, 624, 625, 645; 175/45, 44; 356/153, 138, 154

[56] References Cited

U.S. PATENT DOCUMENTS

| | | | |
|---|---|---|---|
| 1,770,224 | 7/1930 | Anderson | 33/228 |
| 1,830,345 | 11/1931 | Anderson . | |
| 2,088,539 | 7/1937 | Stokenbury | 33/228 |
| 2,136,689 | 11/1938 | Hughes et al. | 33/286 |
| 2,735,652 | 2/1956 | Brady | 175/249 |
| 2,971,373 | 2/1961 | Heldenbrand | 33/227 |
| 3,059,707 | 10/1962 | Frisby | 175/45 |
| 3,703,682 | 11/1972 | Wickman et al. | 356/153 |
| 3,801,205 | 4/1974 | Eggenschwyler | 33/DIG. 21 |
| 4,141,153 | 2/1979 | Nelson | 33/286 |
| 4,150,897 | 4/1979 | Roberts, Jr. et al. | 250/237 G |
| 4,676,636 | 6/1987 | Bridges et al. . | |
| 4,747,454 | 5/1988 | Perryman | 175/45 |

FOREIGN PATENT DOCUMENTS 0038309 2/1987 Japan .................................. 356/138

OTHER PUBLICATIONS

"Laser Alignment Device", NPL, Jan. 1969.

Primary Examiner—Allan N. Shoap
Assistant Examiner—Alvin Wirthlin
Attorney, Agent, or Firm—Pravel, Gambrell Hewitt, Kimball & Krieger

[57] ABSTRACT

A laser beam is used to align instruments, directional core barrel assemblies or other directional equipment before the assemblies are run into wells. A low power laser and special means for clamping the laser and a target to the members of the assembly are employed.

19 Claims, 2 Drawing Sheets

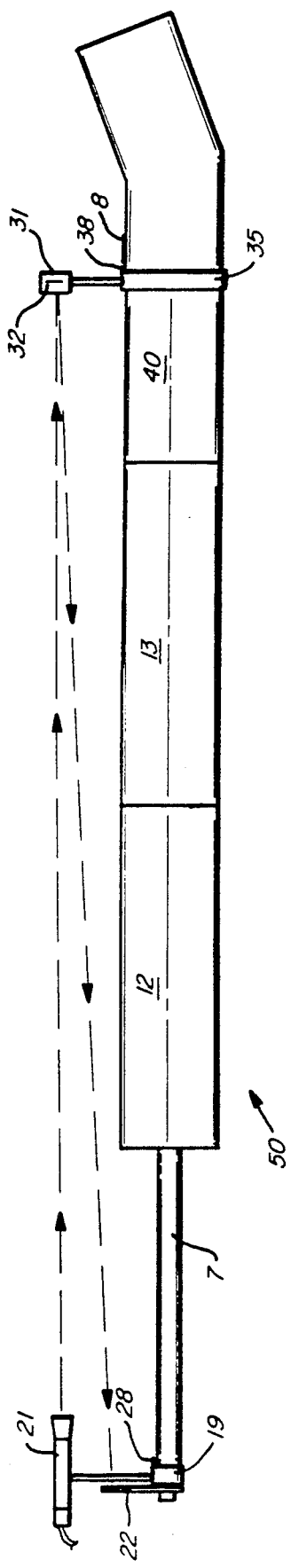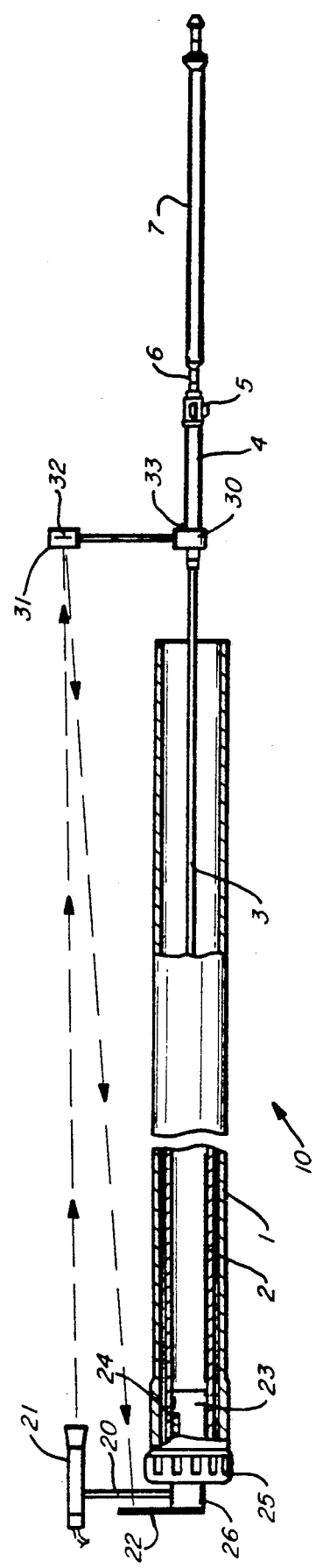
FIG. 1
FIG. 2

LASER ALIGNMENT SYSTEM FOR WELL EQUIPMENT

BACKGROUND OF THE INVENTION

1. Field of the Invention

Apparatus and method are provided for aligning spaced-apart elongated elements, such as tubulars, equipment or instruments used in wells, such that the angle between the spaced-apart elements measured perpendicular to the axis of the elements can be determined or fixed. The apparatus and method are particularly suited for aligning the elements in directional core barrels used for determining the orientation of cores of rock cut from boreholes.

2. Description of Relevant Art

In drilling wells and obtaining information about the rock which the well has penetrated, it is often necessary to measure or fix the relative angular position of various elongated tubular members used in well operations. Visual sighting methods are used on the surface of the earth before the elongated tubular members are lowered into a well. In U.S. Pat. No. 4,141,153, a bottom hole survey apparatus is described wherein alignment between a reference indicator line within a survey instrument and an axially displaced external slot in a mule shoe is provided by visual sighting elements, or "peep holes." Visual sighting is used to align the elongated members of the apparatus, so that the members are oriented in a known direction when they are placed in a well. In U.S. Pat. No. 2,088,539, a means of orienting deflecting tools in wells is described. A telescope and a target are used as sighting members to align one element of the apparatus with another.

In the method of cutting cores or samples of rock from a borehole and measuring the orientation of the rock with respect to survey instruments run into the well, as described in U.S. Pat. No. 2,735,652, it has been common practice to align the various elements of the apparatus by using a telescope attached to one element and a sighting bar attached to another element. U.S. Pat. No. 3,059,707 also discloses use of a telescopic member for aligning markings which are axially displaced in an apparatus for orienting cores. In the patents cited, the telescope and an object used for sighting are attached to tubular members using clamping means which allow the sighting devices to be positioned with respect to a reference line on a tubular member. Other rudimentary techniques of alignment have been used, such as attaching a carpenter's level in a direction perpendicular to the axis of the elements and adjusting the angle until a level position is indicated on each element. Each of these methods depends on ambient light levels high enough to observe the aligning objects and the accuracy of each depends on the care and skill of the operator.

SUMMARY OF THE INVENTION

We have discovered apparatus and a method for performing the alignment of elongated members to be run into a well which can be used without ambient light and which allows highly accurate alignment with little dependence on skill of the operator. A low power laser attached to a first member by a clamp such that the laser is directly above a reference mark on the first member. A mirror having a graduated scale is attached to a second member axially displaced from the first member by a clamp aligned such that a known distance along the graduated scale is directly above a reference mark on the second member. A reference line may also be provided between the laser and the first member, perpendicular to the first member, such that the reflected light from the mirror is received on the reference line. The laser is directed along the common axis of the first and second members and the relative angles of the second member with respect to the first member are adjusted or measured.

The apparatus and method is particularly useful for aligning the scribe used to mark cores entering a core barrel and a survey instrument used in the well which measures and records orientation of the instrument. The laser is attached at the lower end of the core barrel by a clamp which places the laser precisely above the principal scribe knife of the barrel. The clamp and mirror are placed on gear which is rigidly fixed to the orientation-measuring instrument. The laser is powered up and the clamp holding the mirror is moved until the laser beam is precisely centered on the reference point of the graduated scale. The adjustment is checked by verifying that the beam is reflected back to the line between the laser and the core barrel. The coordinates of the instrument are then measured and recorded and the coordinates of the principal scribe shoe of the barrel, aligned with the instrument, will be measured when coordinates of the instrument are measured in the well. The scribe line, formed on a core of rock as it enters the core barrel, is then used to orient the direction of the rock before it was removed from the earth.

BRIEF DESCRIPTION OF THE DRAWINGS

FIG. 1 is a drawing of the arrangement of the laser, the mirror, a protractor and clamping mechanisms when the invention is used to align deflecting apparatus used in wells.

FIG. 2 is a drawing showing the arrangement of the laser attached to a scribe shoe of a core barrel and the target attached to a survey tool used with the core barrel to obtain directional cores of rock from the earth.

DESCRIPTION OF THE PREFERRED EMBODIMENTS

Figure 3:
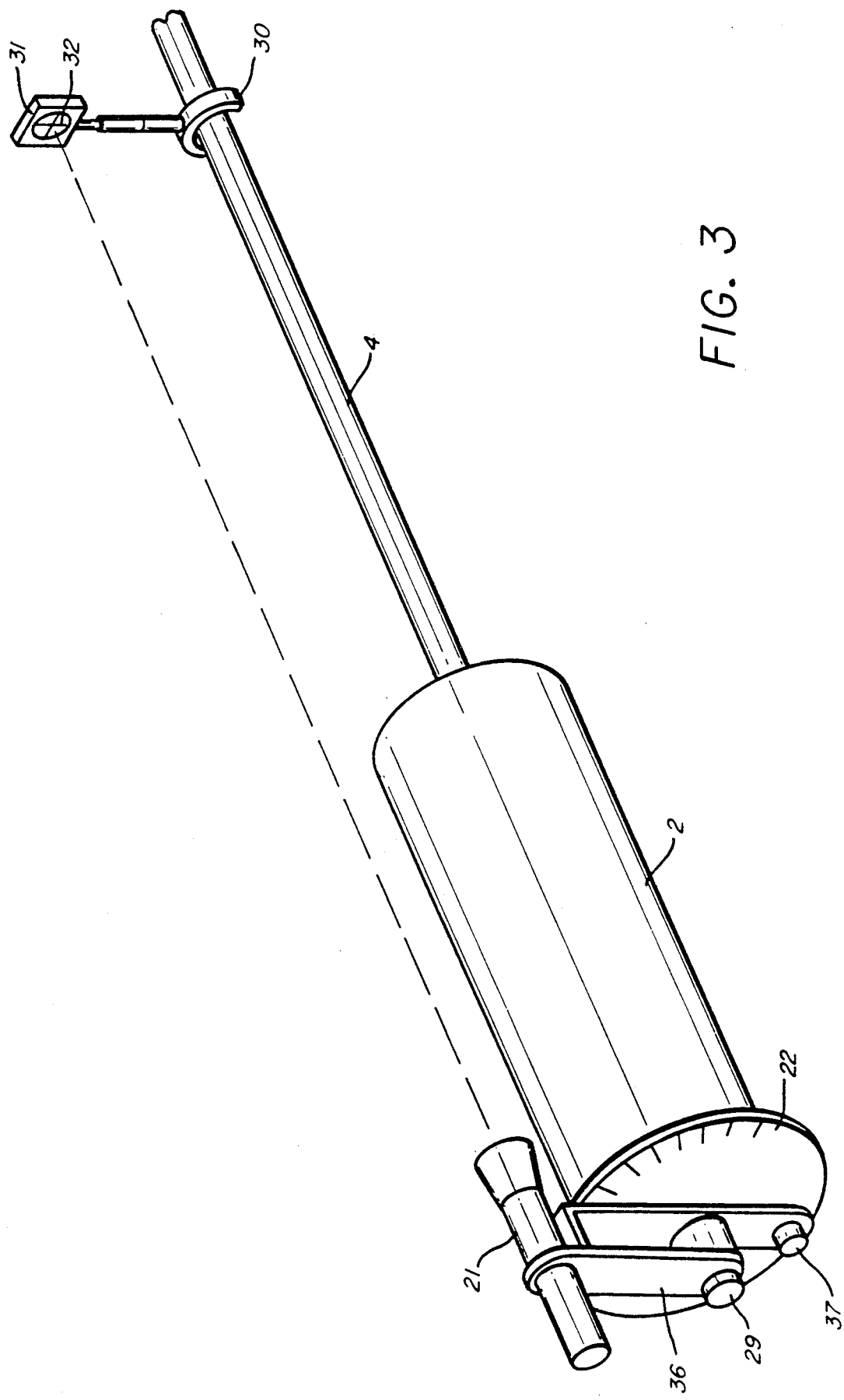
FIG. 3 is a close-up of the laser alignment system used with a core barrel.

In FIG. 1, an elongated assembly 50 to be run into a well is comprised of an orientation-measuring instrument 7, a first spacer 12, a second spacer 13, and a deflecting apparatus 40. The deflecting apparatus 40 can be any of a variety of tools run into wells which are to be oriented to a pre-selected azimuth direction in the well using the orientation-measuring device 7, such device 7 having electrical cable connections (not shown) to the surface of the earth and providing a reading at the earth's surface of the orientation of the instrument 7. The deflecting apparatus 40 can be a bent sub, a bent housing of a downhole motor, or other equipment. The assembly 50 is adapted to be attached to a string of tubular members which is used to lower the assembly 50 into the well and to orient the deflecting apparatus 40 in the preselected direction. The orientation-measuring instrument 7 is adapted to be lowered into the well through the string of tubular members until it seats into a receptacle (not shown) in the first spacer 12, using techniques well-known in the art. The receptacle in the first spacer 12 is adapted to orient the orientation-measuring instrument 7 in a determined angular relationship with respect to the deflecting apparatus 40 using well-known techniques. The apparatus and method of the present invention are used to orient the orientation-measuring instrument 7 and the deflecting apparatus 40 in a known or preselected angular relationship with respect to each other while the assembly 50 is on the surface of the earth.

The spacers 12 and 13 and the deflecting apparatus 40 are fixed together such that orientation with respect to each will not change in the well. The orientation-measuring instrument 7 is attached to the first spacer 12 using the receptacle in the spacer 12. The receptacle orients the orientation-measuring instrument 7 on a common axis with the spacer 12 and in the direction in which it will orient with respect to the first spacer 12 in the well. A laser 21 is clamped to the orientation-measuring instrument 7 using a clamp 19. The clamp 19 is constructed such that a first reference mark 28 on the side of the clamp 19 is on the same radial vector from the common axis as the center of the laser beam. A plate 22 having a line or group of lines, as in a protractor, is attached to the instrument 7 such that a reference line extends from the laser 21 to the orientation-measuring instrument 7. A mirror 31 having a reference mark or reticle 32 is clamped to the deflecting apparatus 40 using a clamp 35. The clamp 35 is constructed such that a second reference mark 38 on the side of the clamp 35 is on the same radial vector as the center of the reticle 32 or of a reference mark on the mirror 31.

The distance between the laser 21 and the mirror 31 is determined by the total length of the spacers 12 and 13, but distances of 100 feet or more are within the range of the present invention. The maximum distance at which the system can be used will be determined by the power of the laser 21 and ambient light conditions. Low power lasers are used to minimize danger of damage to the eyes of operators of the apparatus.

The clamp 35 is adjusted such that the second reference mark 38 is precisely aligned with a reference line 8 on the deflecting apparatus 40. The clamp 19 is then moved circumferentially around the orientation-measuring instrument 7 until the laser beam is precisely centered on the reticle 32. The reflection of the beam should also be centered on the line on plate 22 which extends between the laser 21 and the instrument 7. The instrument 7 is then used to measure the angle between the sensors in the instrument 7 and the vertical force of gravity. This so-called "tool face angle" is then used as the reference angle to measure the direction of the deflecting apparatus 40. The tool face angle is the angle between the radial vector connecting the common axis to the center of the laser beam and the force of gravity. Alternatively, a device allowing rotation of the receptacle (not shown) in the spacer 12 is used to rotate the instrument 7 until the reference tool face angle is zero and the instrument 7 is re-fixed at this angle. The clamps 19 and 35 and the plate 22 are removed and the assembly 50 is aligned and ready to be run into a well.

In FIG. 2, a cut-away drawing of a directional core barrel assembly 10 containing an outer barrel 1 and an inner barrel 2 is shown. The inner barrel 2 has attached thereto a scribe shoe 23 which includes a principal scribe 24 for marking a V-shaped notch in the core of rock as it enters the inner core barrel 2 after being cut from the earth by a bit 25, using techniques well-known in the art. While aligning the total core barrel assembly 10 to be run into a well, a clamp 20 is attached to the inner core barrel 2. The clamp 20 is comprised of a base 26 to fit within the scribe shoe 23 and a support for the laser 21, such that the center of the laser beam is precisely located along the same radial vector from the center of the base 26 of the clamp 20 as the principal notch in the scribe shoe 23. A protractor 22 is also attached to the clamp 20. An extension rod 3 and a spacer bar 4 allow the orientation-measuring instrument 7 to be located a sufficient distance from the metal in the core barrel such that interference with the magnetic field of the earth is minimized and accurate measurements of orientation of the instrument 7 are made using the magnetic field of the earth. A non-magnetic steel stabilizer 5 and an orienting bull plug 6 are often placed between the spacer bar 4 and the instrument 7. While aligning the total core barrel assembly 10 to be run into a well, a mirror 31 containing a reticle 32 is attached to the spacer bar 4 by the clamp 30.

The mirror 31 is moved circumferentially around the spacer bar 4, using the clamp 30, until the beam from the laser 21 is directly centered on the reticle 32. The instrument 7 is then used to measure the tool face angle of the mirror 31, which is the same as that of the laser 21, which is the same as that of the principal scribe 24 in the scribe shoe 23. The angle measured is the reference angle in all subsequent measurements made in the well with the instrument 7. Alternatively, the orienting bull plug 6 between the instrument 7 and the spacer bar 4 is adjusted and the instrument 7 is rotated until the tool face angle measures zero. This angle then becomes the reference angle. The tool face angle in this case is the angle between the radial vector connecting the common axis to the mark 32 on the mirror 31 and the force of gravity.

In FIG. 3, a schematic close-up of the alignment system shows the laser 21, the target mirror 31, and the protractor 22. The laser 21 can be moved by loosening a set screw 37 and rotating an arm 36 around a pin 29. The laser 21 is set at the same angle on the protractor 22 as the angle of the principal scribe 24 of the base of the clamp (not shown). Normally this is zero degrees. The target mirror 31 is moved until the beam is centered on the target. The target is a mirror 31 having a reticle 32 attached thereto. Alternatively, the target is an optical receiver capable of emitting an audible signal which varies with intensity of incident light from the laser 21. Such targets are available from Spectra Physics Corporation under the trade name LASERPLANE. Preferably, a device such as Model No. 350 is used as the target if an audible signal is preferred.

The laser 21 is preferably a low power laser, from 0.5 to 3.0 milliwatt. Safety to operators is the primary consideration in limiting the power of the laser 21. The beam diameter should be small, preferably less than 1 millimeter, and the divergence of the beam should be less than 2 milliradians. A 2 milliwatt helium-neon laser such as Model 1003, available form Uniphase of Manteca, Calif. is suitable. Normally, a power supply operated by 110 volt power is used. Alternatively, the laser 21 is operated by battery power. A suitable mirror 31 and reticle 32 are available from Edmund Scientific Company of Barrington, N.J. If the distance between the laser 21 and the target is more than 20 feet, it is preferable to place a "beam expander" in the laser beam and focus the lenses of the device to minimize beam diameter at the target. Such devices are available from Edmund Scientific Company.

Having described the invention above, various modifications of the techniques, procedures, material and equipment will be apparent to those in the art. It is intended that all such variations within the scope and spirit of the appended claims be embraced thereby.

We claim:

1. Apparatus for aligning on a common assembly axis a first component member and a second component member of a well tool assembly to a known angular relationship comprising:
   a laser for producing a beam of light;
   a mirror with a mark thereon;
   means for attaching the laser to the first member with said laser directed along the common axis and with a first reference mark on a radius from the common axis to said laser adapted for aligning the laser with respect to a reference mark on the first member; and
   means for attaching said mirror with mark thereon to the second member with said mirror perpendicular to the common axis adapted to reflect the beam of said laser and with a second reference mark on the radius from the common axis to said mark on said mirror adapted for aligning the mirror with respect to a reference mark on the second member.

2. The apparatus of claim 1 further comprising a plate having a reference line thereon between a line along the beam of said laser and said first reference mark.

3. The apparatus of claim 1, further comprising a lens in the beam of light for decreasing the diameter of the beam at said mirror.

4. The apparatus of claim 1, wherein said laser has a power between 0.5 milliwatt and 3.0 milliwatt.

5. The apparatus of claim 1, wherein said laser produces a beam with a diameter less than 1 mm and a beam divergence less than 2 milliradians.

6. Apparatus for aligning on a common axis a scribe shoe having a principal scribe thereon and an orientation-measuring instrument used with a coring apparatus, comprising:
   a laser for producing a beam of light;
   a mirror and a mark thereon;
   means for attaching said laser to the scribe shoe of the coring apparatus with said laser directed along the common axis and on the same radius from the common axis as the principal scribe shoe; and
   means for attaching said mirror with said mark thereon to the orientation-measuring instrument and perpendicular to the common axis adapted to reflect the beam of said laser and with a reference mark on the radius from the common axis to said mark on said mirror adapted for aligning the mirror with respect to a reference mark on the orientation-measuring instrument.

7. The apparatus of claim 6 further comprising a plate having a reference line thereon between a line along the beam of said laser and the principal scribe.

8. The apparatus of claim 6, further comprising a lens in the beam of light for decreasing the diameter of the beam at said mirror.

9. The apparatus of claim 6, wherein said laser has a power between 0.5 milliwatt and 3.0 milliwatt.

10. The apparatus of claim 6, wherein said laser produces a beam with a diameter less than 1 mm and a beam divergence less than 2 milliradians.

11. Apparatus for aligning on a common assembly axis a first component member and a second component member of a well tool assembly to a known angular relationship comprising:
   a laser for producing a beam of light;
   a target for the beam comprising means for producing an audible signal when the beam is directed onto said target;
   clamping means for attaching said laser to the first member with said laser directed along the common axis and with a first reference mark on the radius from the common axis to said laser adapted for aligning the laser with respect to a reference mark on the first member; and
   means for attaching said target to the second member perpendicular to the common axis and at a known location with respect to a second reference mark on the second member.

12. Apparatus for aligning on a common axis a scribe shoe having a principal scribe thereon and an orientation-measuring instrument used with a coring apparatus, comprising:
   a laser for producing a beam of light;
   a target for the beam comprising means for producing an audible signal when the beam is directed onto said target;
   means for attaching said laser to the scribe shoe of the coring apparatus with said laser directed along the common axis and on the same radius from the common axis as the principal scribe of the scribe shoe; and
   means for attaching said target to the orientation-measuring instrument and perpendicular to the common axis and with a reference mark on the radius from the common axis to said target adapted for aligning the target with respect to a known direction of the orientation-measuring instrument.

13. The apparatus of claim 12, further comprising a lens in the beam of light for decreasing the diameter of the beam at said mirror.

14. The apparatus of claim 12, wherein said laser has a power between 0.5 milliwatt and 3.0 milliwatt.

15. The apparatus of claim 12, wherein said laser produces a beam with a diameter less than 1 mm and a beam divergence less than 2 milliradians.

16. Method of aligning a first component member and a second component member of a well tool assembly on a common assembly axis to a known angular relationship, comprising the steps of:
   clamping a laser to the first member such that the laser is aligned along the common axis and is at a known location with respect to a reference mark on the first member;
   clamping a mirror having a reference mark thereon perpendicular to the second member;
   adjusting the angular position of the mirror until the beam of the laser is centered on the reference mark of the mirror; and
   measuring the angle of the laser with respect to a known direction.

17. The method of claim 16 further comprising the step of:
   adjusting the angular position of the laser until the reflected beam of the laser is centered on a line between a line along the beam of the laser and the first member.

18. The method of claim 16, further comprising the step of:
   placing a lens in the laser beam to decrease the diameter of a light beam from the laser.

19. The method of claim 16 wherein the known direction is measured by an orientation-measuring instrument.

* * * * *